US010688982B2

(12) United States Patent
Planche et al.

(10) Patent No.: US 10,688,982 B2
(45) Date of Patent: Jun. 23, 2020

(54) METHOD OF SELECTING A DRIVETRAIN AND ASSOCIATED DEVICE

(71) Applicant: RENAULT s.a.s., Boulogne-Billancourt (FR)

(72) Inventors: Gregory Planche, Orsay (FR); Frederic Roudeau, Vitry sur Seine (FR); Aurelien Lefevre, Meudon (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 622 days.

(21) Appl. No.: 15/023,438

(22) PCT Filed: Sep. 22, 2014

(86) PCT No.: PCT/FR2014/052345
§ 371 (c)(1),
(2) Date: Mar. 21, 2016

(87) PCT Pub. No.: WO2015/067863
PCT Pub. Date: May 14, 2015

(65) Prior Publication Data
US 2016/0236673 A1 Aug. 18, 2016

(30) Foreign Application Priority Data
Nov. 8, 2013 (FR) ..................................... 13 60968

(51) Int. Cl.
*B60W 20/30* (2016.01)
*B60W 10/02* (2006.01)
(Continued)

(52) U.S. Cl.
CPC ............ *B60W 20/30* (2013.01); *B60W 10/02* (2013.01); *B60W 10/10* (2013.01); *B60W 20/11* (2016.01);
(Continued)

(58) Field of Classification Search
CPC ...... B60W 10/06; B60W 10/02; B60W 10/08; B60W 20/00; B60W 2510/0241;
(Continued)

(56) References Cited

U.S. PATENT DOCUMENTS

| 7,021,409 | B2* | 4/2006 | Tamor | ............... B60W 20/10 180/65.25 |
| 2011/0213519 | A1* | 9/2011 | Huber | ............... B60K 6/485 701/22 |
| 2014/0103761 | A1* | 4/2014 | Atkins | ............... B60K 6/105 310/74 |

FOREIGN PATENT DOCUMENTS

| DE | 10 2005 049 667 A1 | 6/2006 |
| DE | 10 2008 042 132 A1 | 3/2010 |

(Continued)

OTHER PUBLICATIONS

Translate_WO2013001206.pdf (Year: 2013).*
(Continued)

*Primary Examiner* — Tuan C To
*Assistant Examiner* — Paul A Castro
(74) *Attorney, Agent, or Firm* — Oblon, McClelland, Maier & Neustadt, L.L.P.

(57) ABSTRACT

A method controlling a state of a drivetrain including a set of couplers and reducers between a powertrain of a motor vehicle and one or a plurality of drive wheels of the vehicle, the drivetrain configured to take up a plurality of kinematic states each defined by a diagram of engagements of the couplers and reducers making it possible to link an engine of the powertrain to at least one drive wheel, the method including: calculating, before changing the kinematic state, depending on a current speed of the vehicle, a current kinematic state of the vehicle, and an intended kinematic (Continued)

state that is different from the current state, a change-of-state end speed; and comparing the change-of-state end speed with a threshold.

10 Claims, 3 Drawing Sheets

(51) Int. Cl.
    *F16H 59/44*     (2006.01)
    *F16H 61/02*     (2006.01)
    *B60W 20/11*     (2016.01)
    *B60W 10/10*     (2012.01)
    *B60K 6/48*     (2007.10)

(52) U.S. Cl.
    CPC ......... *F16H 59/44* (2013.01); *F16H 61/0204* (2013.01); *F16H 61/0213* (2013.01); *B60K 6/48* (2013.01); *B60W 2520/10* (2013.01); *B60W 2530/16* (2013.01); *B60W 2710/1005* (2013.01); *B60W 2720/10* (2013.01); *B60W 2720/30* (2013.01); *F16H 2061/0216* (2013.01); *F16H 2302/00* (2013.01); *Y02T 10/6221* (2013.01); *Y10S 903/93* (2013.01); *Y10S 903/945* (2013.01)

(58) Field of Classification Search
    CPC ............ B60W 2540/10; B60W 20/10; B60W 2510/0657; B60W 2520/10; B60W 2710/083; B60W 30/18018; B60W 30/18072; B60W 30/1819; B60W 30/19; B60W 20/13; B60W 20/15; B60W 20/40; B60W 2510/081; B60W 2510/088; B60W 2520/105; B60W 2520/125; B60W 2540/103; B60W 2710/0605; B60W 2710/0644; B60W 2710/0666; B60W 30/18172; B60W 30/188; B60W 30/1882; B60W 40/04; B60W 40/105; B60W 40/114; B60W 50/0097

See application file for complete search history.

(56) References Cited

FOREIGN PATENT DOCUMENTS

WO     2013/001206 A1     1/2013
WO     WO-2013001206 A1 *   1/2013   ............ B60W 10/06

OTHER PUBLICATIONS

Translate_WO2013001206.pdf (previously submitted) (Year: 2013).*
International Search Report dated Dec. 16, 2014 in PCT/FR2014/052345 filed on Sep. 22, 2014.
French Preliminary Search Report dated Apr. 25, 2014 in Patent Application No. 1360968 filed on Nov. 8, 2013.

* cited by examiner

METHOD OF SELECTING A DRIVETRAIN AND ASSOCIATED DEVICE

The invention concerns systems for transmission of energy between a motor of a motor vehicle and one or more wheels of the vehicle, and in particular methods of managing such transmission systems. The vehicle may in particular be a hybrid vehicle.

A drivetrain typically comprises a set of couplers and reducers which can link one or more motors of a powertrain to one or more groups of drive wheels of the vehicle. The drivetrain may assume different kinematic states, each kinematic state being defined by an engagement ratio of the couplers and reducers. A kinematic state may for example correspond to complete decoupling between all motors and all wheels of the vehicle, the vehicle wheels being left either freely rotating or blocked in rotation. The drivetrain also usually comprises a plurality of kinematic states, each allowing the linking of at least one motor to at least one group of drive wheels, in order to propel the vehicle.

A kinematic state is essentially selected based on the torque at the wheels requested by the driver—requested for example by pressing an accelerator pedal—and the current rotation speed of the vehicle wheels. Selection may also take into account other parameters, such as the reserves of the different types of fuel available (fossil fuel, energy reserve in the electric batteries), the location of travel of the vehicle (urban or rural), the acoustic comfort and the driving pleasure. Certain kinematic states must be prohibited since the operating point (torque, rotation speed) which would apply in this kinematic state to at least one of the motors concerned is not available to this motor. It is therefore necessary, before changing the kinematic state, to verify that the operating points of each of the motors used for this kinematic state are permitted operating points for this motor. Such an approach may prove complicated since it requires recalculation of the operating point of each motor for each kinematic state, as a function of the current speed state of the vehicle. Also, since the change of kinematic state is not instantaneous, the effective operating point of the motors at the end of the change of kinematic state risks being different from the operating point corresponding to the current parameters of motion of the vehicle, and there is a risk of at least one of the motors used running at overspeed.

The object of the invention is to propose a method for managing the kinematic states of a vehicle, which is simple to implement and which allows the development of the state of the vehicle to be taken into account during the change of kinematic state.

To this end, the invention proposes a method for controlling the state of a drivetrain of a motor vehicle, in particular a motor vehicle with hybrid propulsion. The drivetrain comprises a set of couplers and reducers between a powertrain of the vehicle and one or more drive wheels of the vehicle. The powertrain may comprise an internal combustion engine. The powertrain may comprise at least one electric motor. The drivetrain may comprise a plurality of kinematic states each defined by an engagement ratio of the couplers and reducers allowing the linking of a motor of the powertrain to at least one drive wheel. In the method, an end speed of the change of state is calculated before the kinematic state is changed, as a function of a current speed of the vehicle, the current kinematic state of the vehicle and an intended kinematic state different from the current state. This end speed of the change of state is compared with a threshold. The threshold may be a value tabulated as a function of the intended kinematic state. According to an advantageous embodiment, the powertrain may comprise several motors, i.e. several sources of motive power may be activated and linked to the drive wheels independently of each other. A plurality of motors may be associated with a same wheel or with a same set of drive wheels. A plurality of motors may each be associated with a different set of drive wheels. According to variant embodiments, a plurality of motors, i.e. several sources of motive power, may be activated and linked to the wheels simultaneously in at least some of the kinematic states available. In certain kinematic states, at least one of the motors connected to a drive wheel may be used to provide a braking energy, in some cases converted into electrical energy. According to variant embodiments, the method may be applied to a drivetrain linking a single motor to the wheels of the vehicle according to different kinematic curves.

According to a preferred embodiment, to calculate the end speed of the change of state, a first time increment is multiplied by a first traction force. Preferably, the first time increment comprises a term tabulated as a function of both the current kinematic state and the intended kinematic state. According to a preferred embodiment, the first time increment may also comprise an additional term, if a motor used for the intended kinematic state is currently at rest and must be started up in order to put the drivetrain into the intended kinematic state, in particular if an internal combustion engine must be started.

The value selected for the first traction force may be calculated by using the smallest value of a reference traction force and a traction force resulting from a first map linking the vehicle speed to a traction force. The reference traction force is for example a reference calculated from the signal from an accelerator pedal of the vehicle.

Advantageously, the first map is selected from a plurality of maps as a function of the pair formed by the current kinematic state and the intended kinematic state. In fact the first traction force tabulated by the first map is the maximum traction force available at the vehicle wheels as a function of the vehicle speed when an intermediate kinematic state is established. This intermediate kinematic state is a state which exists or is established until the intended state is established. This may be a state with an interruption of torque at the wheels, or it may be a state allowing at least part of the torque at the wheels to be maintained. For illustration, the intermediate kinematic state may be a state in which certain wheels of the vehicle are driven by an electric motor, in order to pass from a state in which the vehicle is propelled exclusively by one or more electric motors, to a state in which the vehicle is propelled at least partly by an internal combustion engine. In certain cases, the transition state is the initial kinematic state.

According to a preferred embodiment, to calculate the end speed of the change of state, also a second time increment is multiplied by a second traction force. Preferably, the second time increment is constant or is a constant value tabulated as a function of the intended kinematic state, corresponding for example to a minimum desired duration in the new kinematic state. The product of the second time increment by the second traction force is added to the product of the first time increment by the first traction force. The first and second time increments may be replaced by two values which are proportional to time increments, for example a time increment divided by a mass of the vehicle. The second time increment may be of the order of 1 to 4 s, and preferably between 1.5 and 2 s. The first time increment may be the sum of a first value which may be constant or tabulated, and which lies between 0.2 s and 4 s, and preferably between 0.5 s and 2.5 s, and of a second value which is only added for certain kinematic states (for example when a motor must be started) and which lies between 0.5 s and 3 s, and preferably between 1 and 2 s.

According to a preferred embodiment, to calculate the second traction force, the smallest value is used of a reference traction force and a traction force resulting from a second map linking the vehicle speed to a traction force. The second traction force shown on the second map corresponds to the maximum force which would be available at the wheels for the current vehicle speed if the vehicle were already in the intended state. It is possible to use maps of the torque at the vehicle wheels instead of maps of linear traction force, and then divide the values obtained by the radius of the vehicle wheels, for example by integrating the inverse of the wheels in a multiplying coefficient. The multiplying coefficient may also integrate the inverse of the vehicle mass.

It remains within the scope of the invention if, instead of first multiplying the forces by the time increments, they are multiplied directly by multiplying coefficients which integrate not only one of the time increments to be taken into account but also, depending on variant embodiments, the inverse of the vehicle mass and if necessary the inverse of the wheel radius. The multiplying coefficient is then the product of a time increment by the inverse of the vehicle mass, and if necessary by the inverse of the wheel radius.

Advantageously, for each kinematic state, the second map may be selected from a group of maps each linking the wheel rotation speed and a maximum traction force of the vehicle available for one of the kinematic states of the vehicle traction drivetrain. The map corresponding to the intended kinematic state is used. The traction drivetrain may naturally be a propulsion drivetrain if the motor torque is transmitted to the rear wheels of the vehicle.

According to a preferred embodiment, when calculating the end speed of the change of state, a resistive force, calculated in particular as a function of the history of a traction force at the vehicle wheels and of a history of the speed of the vehicle, is subtracted from at least one of the forces taken into account. The resistive force may be calculated by a balance of energy conservation to take into account the gradient of the road and the friction forces opposing the advance of the vehicle. Preferably, the resistive force is subtracted from the first traction force and, if taken into account, the resistive force is also subtracted from the second traction force.

By multiplying each of the force differences by the considered time increment and by dividing this by the vehicle mass, we obtain variations in vehicle speeds during the first and during the second time increment. By adding these speed variations, we obtain a potential speed variation of the vehicle during the intended change of kinematic state.

Advantageously, the theoretical end speed of the change of state is compared with a threshold which is a function of the intended kinematic state, and the change of state to this kinematic state is prohibited at least temporarily if the theoretical speed is greater than said threshold.

The invention also proposes a drivetrain system for a motor vehicle, in particular a motor vehicle with hybrid propulsion, the system comprising a set of couplers and reducers able to link one or more drive wheels of the vehicle to a powertrain of the vehicle. The drivetrain may assume a plurality of kinematic states each defined by an engagement ratio of the couplers and reducers allowing the linking of a motor of the powertrain to at least one drive wheel. The system comprises an electronic control unit configured to calculate an end speed of the change of state before the kinematic state is changed, as a function of a measured speed of the vehicle, the current kinematic state of the transmission system and an intended kinematic state different from the current state, and to compare the calculated end speed of the change of state with a threshold. The vehicle may be a vehicle with hybrid drive or a vehicle with a single motor. The invention is particularly advantageous for hybrid vehicles, the drive system of which may assume numerous different kinematic states from which a selection must be made. The invention may also apply to a vehicle with a single motor, in order to authorize or prohibit certain speed changes.

The invention also proposes a motor vehicle with hybrid propulsion comprising a transmission system as described above, wherein the transmission system may occupy different kinematic states including at least one kinematic state in which the torque at the wheels can be provided at least partly by a first internal combustion engine, at least one kinematic state different from the first in which the torque at the wheels may be provided at least partly by an electric motor, and comprising an electronic control unit configured to prohibit, per time intervals, some of the kinematic states as a function in particular of the current kinematic state of the transmission system, the speed of the vehicle and the history of the speed of the vehicle.

Further aims, characteristics and advantages of the invention will appear from reading the description below, which is given merely as a non-limitative example, with reference to the attached drawings on which.

Figure 1:
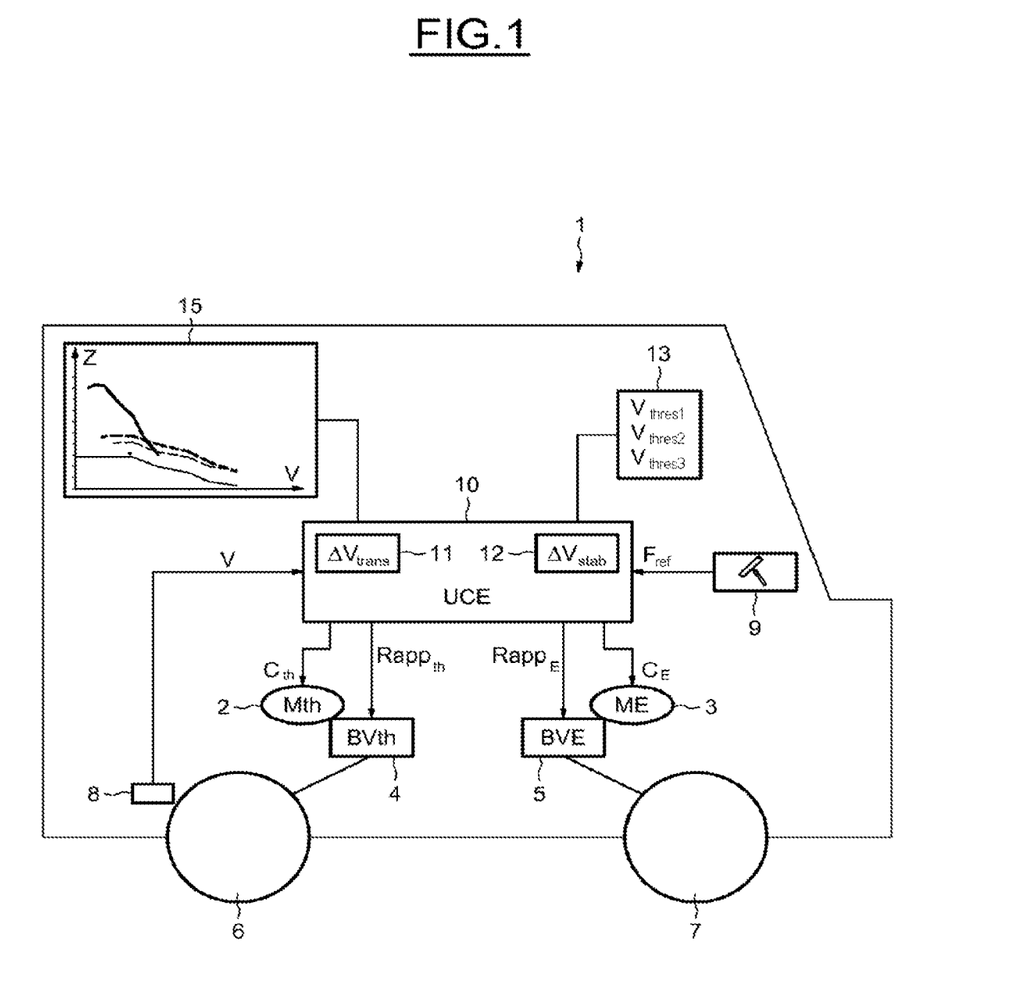
FIG. 1 is a diagrammatic representation of a vehicle equipped with a drivetrain system according to the invention.

As illustrated on FIG. 1, a vehicle 1 with hybrid propulsion comprises an internal combustion engine 2, an electric motor 3, a gearbox 4 (BVth) associated with the internal combustion engine, in some cases a gearbox 5 (BVE) associated with the electric motor 3, a speed sensor 8 allowing estimation of the speed of at least one vehicle wheel, an accelerator pedal 9 and an electronic control unit 10 which allows the imposition of both a reference torque $C_{th}$ on the internal combustion engine and a reference torque $C_E$ on the electric motor 3. The electronic control unit 10 is configured to provide a reference value $Rapp_{th}$ imposing the positioning of various couplers and reducers of the gearbox 4 associated with the internal combustion engine, in order to obtain a certain state of speed ratio between the input and the output of the gearbox 4. The electronic control unit 10 is configured to provide a reference value $Rapp_E$ imposing the positioning of various couplers and reducers of the gearbox 5 associated with the electric motor, in order to obtain a certain state of speed ratio between the input and output of the gearbox 5. The reference values $Rapp_{th}$ and $Rapp_E$ together define a reference kinematic state of the vehicle drivetrain.

The electronic control unit 10 comprises a first calculation module 11 configured to calculate a variation in the vehicle speed which the vehicle is liable to experience during a proposed change of kinematic state, and comprises a second calculation module 12 configured to calculate a second speed increment which the vehicle is liable to experience during a so-called "stabilization" time interval following the change of kinematic state. The stabilization time increment may for example correspond to a minimum duration for which it is deemed useful to leave the drivetrain in the new state once the change of kinematic state has been performed. This time interval may be provided to be sufficiently long to be able to arrange a new change of kinematic state, should the current kinematic state no longer be relevant once implemented (for example, following a new signal at the pedal).

To calculate the first and second speed increments, the calculation modules 11 and 12 use a series of maps 15 which, for each kinematic state of the drivetrain, link the traction force available at the wheels to the linear speed of the vehicle. Naturally, depending on the variant embodiments, the maps may comprise as input data a torque at the wheels instead of a traction force at the wheels, and may comprise in the ordinate a wheel rotation speed instead of a linear vehicle speed.

A change of kinematic state may be provoked at the electronic control unit 10, for example after a change in the signal from the accelerator pedal, after crossing a threshold concerning one or more energy reserves of the vehicle, after a request from the driver to use a preferred energy source, or after a request from the driver to limit the level of polluting emissions. The electronic control unit 10 then, for several conceivable kinematic states which meet the preceding criteria, determines what the vehicle speed would be following the change in kinematic state and the stabilization phase. The control unit, using a value tabulated in a limit speed table 13, verifies that the speed achieved by the vehicle at the end of the change in kinematic state is compatible with a limit speed corresponding to this intended kinematic state.

Figure 2:
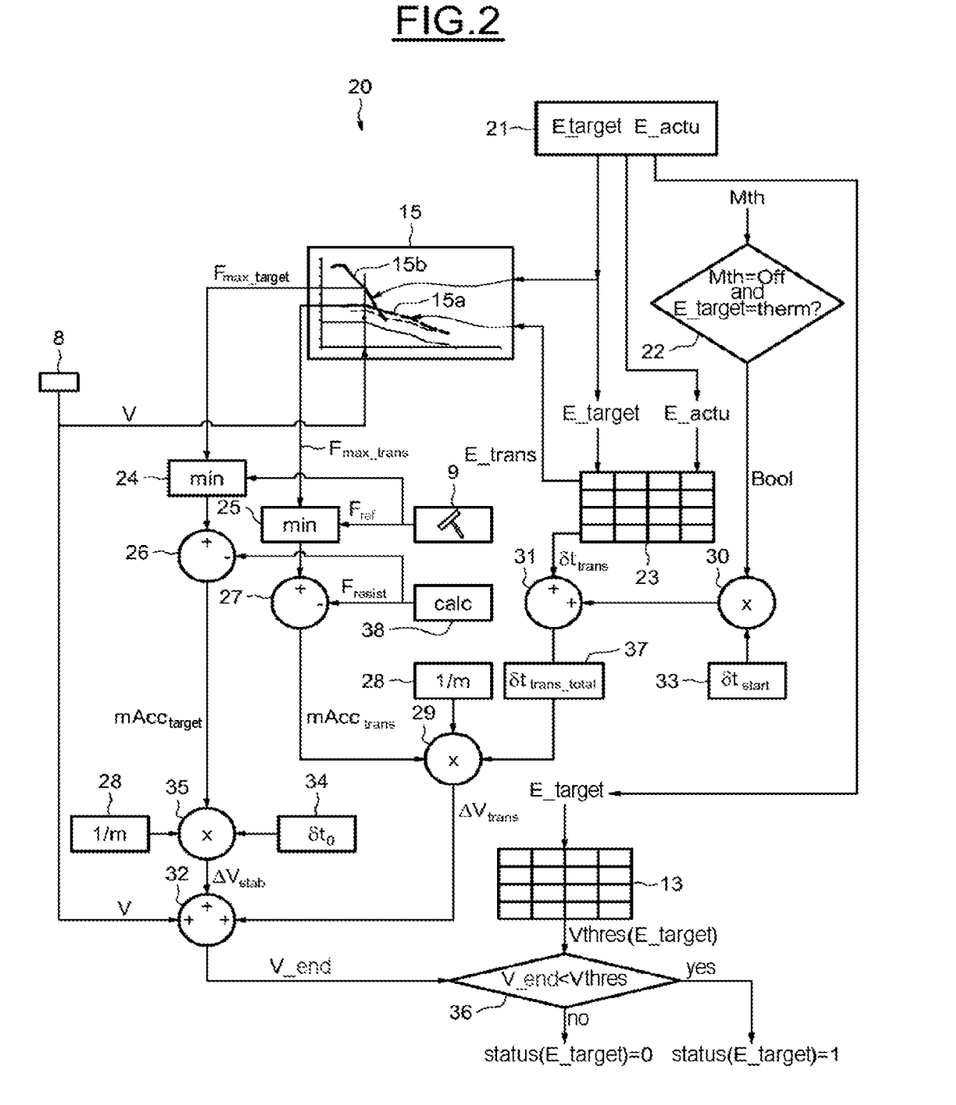
FIG. 2 is a simplified algorithm of a method for managing a drivetrain according to the invention.

FIG. 2 illustrates a simplified algorithm 20 of the method for eliminating or authorizing conceivable kinematic states used by the electronic control unit 10 of the vehicle in FIG. 1.

FIG. 2 shows elements common to FIG. 1, wherein the same elements are designated by the same references.

As illustrated on FIG. 1, at a step 21 the electronic control unit 10 decides to explore the possibility of switching from a kinematic state E_actu to a kinematic state E_target. To this end, the electronic control unit 10 reads in one or more tables 23 firstly an identifier "E_trans" of a transitory kinematic state which is intended to be established during the change of kinematic state from the first kinematic state E_actu to the intended kinematic state E_target. It also reads in the table 23, or in another table, a time interval value $\delta t_{trans}$ corresponding to a duration necessary to perform the change of kinematic state from the current kinematic state E_actu to the intended kinematic state E_target. As a safety measure, the time interval $\delta t_{trans}$ may be overestimated slightly relative to values known by experiment for this type of kinematic transition. The electronic control unit 10 uses the indicator E_trans of the transitory kinematic state to read, in the series of maps 15, firstly a first curve 15a associated with this transitory kinematic state and secondly a second curve 15b associated with the intended kinematic state E_target. On the curves 15a and 15b, the electronic control unit 10 retrieves, for the speed value V obtained using the speed sensor of wheel 8, respectively a first traction force $F_{max\_trans}$ and a second traction force $F_{max\_target}$ corresponding respectively to the maximum traction force at the wheels which the drivetrain can apply to the wheels in the transitory kinematic state for the current speed V of the vehicle, and to the maximum traction force at the wheels which the drivetrain can apply to the wheels for the intended kinematic state. Since the curves linking the traction force and speed generally decrease when the vehicle is in the acceleration phase, values $F_{max\_trans}$ and $F_{max\_target}$ are also maximum values for the traction force which the drivetrain can apply to the wheels not only for the current vehicle speed but also for the speeds which may be achieved during the change in kinematic state. Force values $F_{max\_trans}$ and $F_{max\_target}$ are sent respectively to a selection operator 25 and a selection operator 24. The selection operators 25 and 24 each select the smaller of the values between the value received from the set of maps 15 and a value $F_{ref}$ representing a reference traction force at the wheels, calculated from the position of the accelerator pedal 9. The values resulting from the selection operators 24 and 25 are therefore maximum values for the traction force (or torque) at the wheels able to be developed respectively during the stabilization phase and during the phase of change of kinematic state, depending on whether or not the reference from the accelerator pedal exceeds the maximum torque stored in the maps 15. Each of these maximum forces is then sent respectively to a subtractor 26 and a subtractor 27, which subtract a resistive force value $F_{resist}$ from the maximum force potentially applied at the wheels. The value $F_{resist}$ is calculated by a calculation unit 38 which may, in a manner known elsewhere, perform a balance of the forces exerted on the vehicle and compare these with the variations in acceleration of the vehicle. The subtractors 26 and 27 therefore each provide a maximum total force value applied to the vehicle in the direction of its acceleration of movement. The value resulting from the subtractor 26 corresponds to the maximum total force applied during the stabilization phase after the change in kinematic state, and the value from the subtractor 27 corresponds to the maximum total force applied to the vehicle during the intended change in kinematic state. These values are sent respectively to the multipliers 35 and 29 which multiply them firstly by the inverse 28 of the vehicle mass, taken for example as a mean value of the vehicle mass, and by a time increment 34 and 37 respectively. The time increment 34 corresponds to a time increment $\delta t_0$ corresponding to a minimum time necessary for stabilization after a change in kinematic state. This value may be constant, it may be the same for all changes of state, or it may be a variable value depending on the intended state or depending on the intended change of state. The time interval 37 may correspond to a time interval $\delta t_{trans\_total}$ corresponding to the total time necessary to perform the intended change of state. This total time in particular takes into account a first time interval $\delta t_{trans}$ sent to a summing integrator 31, which represents the time necessary to modify the engagement ratios of the coupler and reducer, and which is read by the electronic control unit in the table 23. It may also take into account a time $\delta t_{start}$ which is sent to the summing integrator 31 only if the intended state requires the use of an internal combustion engine and if the internal combustion engine must be started, which requires the additional time interval $\delta t_{start}$.

To calculate the time interval $\delta t_{trans\_total}$, the electronic control unit 10 performs a test 22 to establish whether firstly the internal combustion engine 2 is stopped, and whether secondly the intended kinematic state E_target requires the use of the internal combustion engine 2. The result of the test is a Boolean value Bool which is sent to a multiplier 30. The multiplier 30 receives at another output a value 33, here marked $\delta t_{start}$, which corresponds for example to the time necessary to start the internal combustion engine. The result of the multiplier 30 is sent to the summing integrator 31 which receives at its other input the value $\delta t_{trans}$ read from the table 23 as a function of the pair of indices E_actu and E_target. The result from the summing integrator 31 is then sent to the multiplier 29 which gives a value $\Delta V_{trans}$ corresponding to an estimate of the speed increment by which the speed of the vehicle risks varying during the change in kinematic state. Similarly, the multiplier 35 gives a value $\Delta V_{stab}$ corresponding to the speed increment by which the speed of the vehicle risks varying during the time $\delta t_0$ considered necessary for stabilization of the kinematic state. A summing integrator 32 adds the value V of the current speed of the vehicle and the values $\Delta V_{stab}$ and $\Delta V_{trans}$. The result is a value V_end which corresponds to an estimate of the maximum final speed which the vehicle risks assuming once the kinematic state has been changed, after the stabilization phase of the intended kinematic state. The speed value V_end is sent to a test 36 which compares this speed with a value Vthres (E_target) which is read from a table 13 linking the conceivable kinematic states for the drivetrain and the maximum speeds permissible for the vehicle for each of these kinematic states. Following the test 36, if the end speed of the change of state V_end is less than the maximum permitted speed Vthres for the intended kinematic state, the electronic control unit 10 updates a variable, for example a Boolean variable Status, which is associated with the kinematic state E_target and which may for example be equal to 1 if a transition to the kinematic state E_target is authorized, and which may be equal to 0 if a transition to the kinematic state E_target is prohibited.

Variant embodiments may be considered in which the speed V_end, which is taken into account for comparison with a threshold, is calculated by taking into account only the forces exerted during the transitory state before completion of the change of kinematic state.

However, because of the reaction time of the drivetrain and the associated management system, once a change in kinematic state has been made, a minimum time elapses before it is possible to switch to a third kinematic state. It is therefore advantageous to take into account the potential speed gain of the vehicle during the stabilization phase of the intended kinematic state.

Variant embodiments may also be considered which tend to further overestimate the end speed of the change in the kinematic state. For example, variants could be considered which for example take into account only a single curve of the force at the wheels as a function of the vehicle speed, this curve then corresponding to the intended kinematic state, without taking into account the curve corresponding to the transitory state. It would then be conceivable to multiply the smaller of this value and the force resulting from the signal at the pedal, by the sum of a duration corresponding to a time necessary to perform the change of kinematic state and of a time necessary for stabilization in this kinematic state. According to yet another variant embodiment, only the force at the wheels corresponding to the transitory state may be taken into account.

In the case where the change in kinematic state is carried out with a reduction in vehicle speed, it is also useful—to be on the safe side—to overestimate the speed at the end of the change in kinematic state and after stabilization. The method of assessing the maximum force applied during the change in kinematic state and during the stabilization phase remains relevant.

Figure 3:
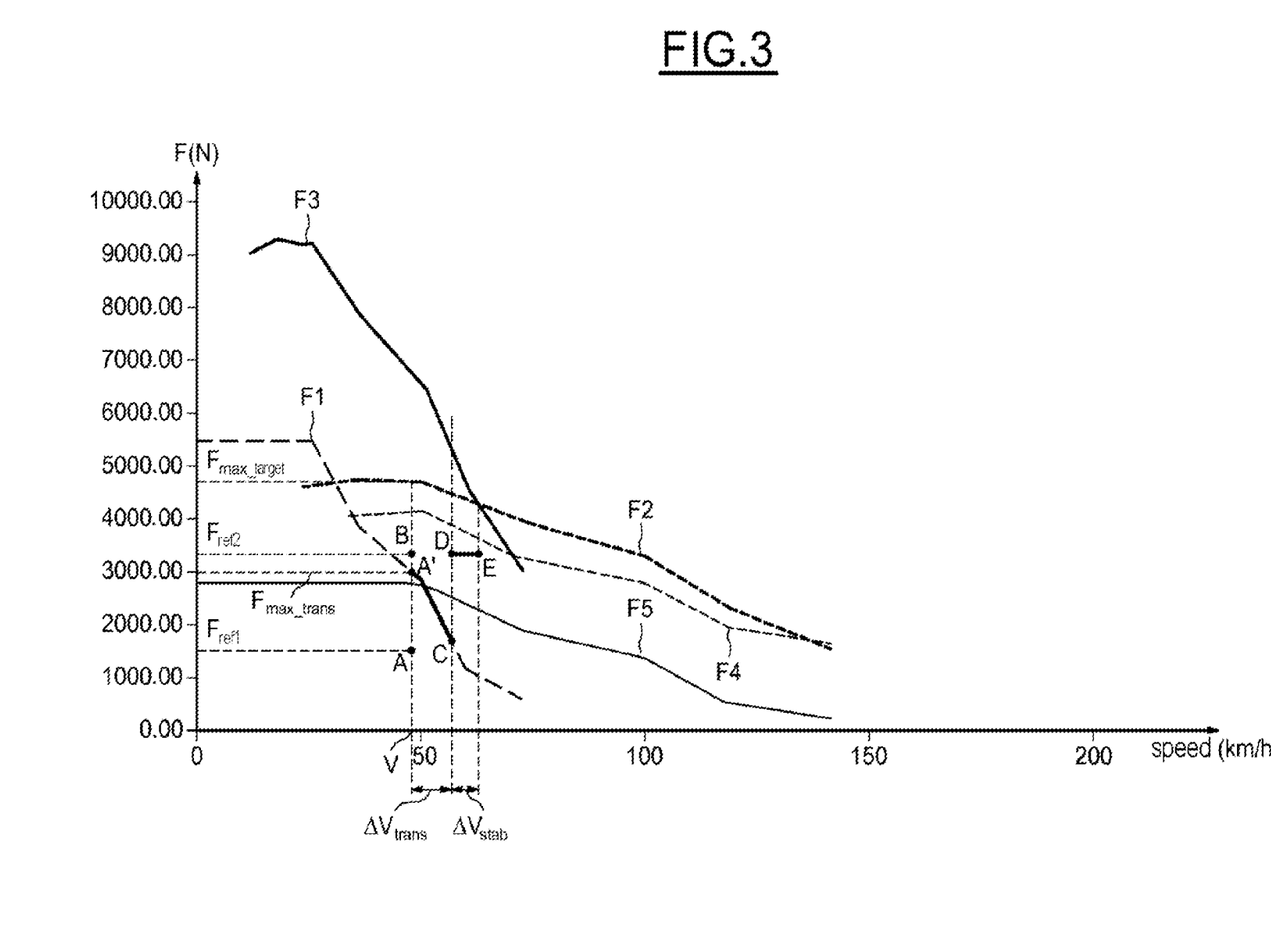
FIG. 3 is a simplified example of a map used in a management method according to the invention.

FIG. 3 illustrates a group of curves corresponding to maps referenced 15 on FIGS. 1 and 2, and the positioning in relation to these curves of some operating points taken into account in the method according to the invention. These curves, some of which are marked here by references F1, F2, F3, F4, F5, each link the maximum traction force in Newtons, which could be developed at the wheels in a given kinematic state, with the speed in km/h of the vehicle. Before selecting an intended state "E_target" in order to study its acceptable nature in accordance with algorithm 20 of FIG. 2, the electronic control unit 10 must verify that the operating point requested (speed V of the vehicle, reference force requested by the pedal signal) lies below the curve of the kinematic state considered, otherwise the torque requested at the pedal cannot be achieved. Once this verification has been performed, the analysis of FIG. 2 may begin for each of the kinematic states verifying the preceding point.

FIG. 3 shows points A, A', B, C, D, E corresponding to characteristic operating points during a change of kinematic state. At an initial instant, the kinematic state in progress corresponds to curve F1. The operating point of the vehicle corresponds to point A. This state is compatible with all kinematic states for which the curves are illustrated in FIG. 3. This operating point A corresponds to a current speed V of the vehicle and to a current reference traction force $F_{ref1}$. The driver then presses the accelerator pedal 9, thus giving a reference traction force corresponding to a value $F_{ref2}$. Point B represents the corresponding operating point for the same speed V. This reference traction force $F_{ref2}$ can only be obtained using kinematic states for which the curves lie above point B, i.e. the kinematic states corresponding to curves F2, F3 and F4. It is here assumed that the electronic control unit 10 studies the possibility of bringing the drivetrain from the state corresponding to curve F1 to the state corresponding to curve F2, and that the transition state is that corresponding to curve F1 itself. During the time interval $\Delta V_{trans}$ marked on the abscissa axis, and during the actual change in kinematic state, the vehicle speed will normally develop like the speed of an operating point which moves from a point A' to point C. The operating point A' corresponds to the maximum increase possible in the traction force before the change in kinematic state, and the portion of the curve between A' and C corresponds to the continued increase in speed of the vehicle with a torque value limited by the position of curve F1. Once the kinematic state has been changed, the operating point may again lie at a point D. The abscissa for point D shows the speed of the vehicle at the end of the kinematic change, and the ordinate shows the torque reference $F_{ref2}$ emanating from the pedal. Since point D lies below the curve F2 of the new kinematic state which henceforth applies, the operating point of the vehicle may then evolve following the horizontal D-E corresponding to the application of the reference force $F_{ref2}$ at the pedal during the time interval $\delta t_0$, which leads to an increase in speed of $\Delta V_{stab}$. Thus the variation in speed achieved at the end of stabilization of the change of kinematic state corresponds to the sum of a speed variation $\Delta V_{trans}$ and a speed variation $\Delta V_{stab}$. The speed variation $\Delta V_{trans}$ is here estimated from the force $F_{max\_trans}$ corresponding to the ordinate of point A', and the speed increment $\Delta V_{stab}$ is estimated from the pedal reference $F_{ref2}$ since this reference is lower than the maximum values permitted by the curve F2.

The invention is not limited to the exemplary embodiments described and may comprise numerous variants. The time intervals corresponding to stabilization may be the same for all kinematic states, or may be a function of the final kinematic states, or may be a function of the pair of the initial state and the final kinematic state. It is possible to take into account, as well as the pedal reference, only one maximum force value read from a single curve linking the force and the vehicle speed. It is possible not to take the minima between the pedal reference and a force read from a map, but to limit the force exerted with an upper value by taking into account only the force resulting from the pedal reference, or only a force read only in a map. There is however a risk in these cases of often overestimating the final speed of the vehicle and hence prohibiting certain kinematic states more often than necessary. The method of managing the kinematic states of a drivetrain according to the invention allows, in a simple manner, systematic preselection from kinematic states which are possible or not possible, without damaging the motor or motors of the vehicle and without damaging transmission elements such as couplers and reducers.

The invention claimed is:

1. A method controlling a state of a drivetrain of a motor vehicle, or a motor vehicle with hybrid propulsion, wherein the drivetrain includes a set of couplers and reducers between a powertrain of the vehicle and one or more drive wheels of the vehicle, the drivetrain configured to assume a plurality of kinematic states, and each of the kinematic states is defined by a different engagement of the couplers and reducers of a transmission that links a motor of the powertrain to at least one drive wheel, the method comprising:
  calculating an end speed of a change of state before a kinematic state is changed based on a current speed of the vehicle, a current kinematic state of the vehicle, and an intended kinematic state different from the current kinematic state, the calculating comprising:
    calculating a transition time interval for the current kinematic state to be changed to the intended kinematic state,
    calculating a change in speed of the motor vehicle during the transition time interval, the change in speed of the motor vehicle during the transition time interval being equal to a difference in a value of the speed of the vehicle at a start of the transition time and a value of the speed of the vehicle at an end of the transition time,
    calculating a stabilization time interval for the motor vehicle to be stabilized in the intended kinematic state, and
    calculating a change in speed of the motor vehicle during the stabilization time interval, the change in speed of the motor vehicle during the stabilization time interval being equal to a difference in a value of the speed of the vehicle at a start of the stabilization time and a value of the speed of the vehicle at an end of the stabilization time, and
    adding the change in speed of the motor vehicle during the transition time interval and the change in speed of the motor vehicle during the stabilization time interval to the current speed of the vehicle to determine the end speed of the change of state;
  comparing the calculated end speed of the change of state with a threshold; and
  prohibiting the change of state to the intended kinematic state at least temporarily when the calculated end speed is greater than the threshold.

2. The method as claimed in claim 1, wherein the calculating includes multiplying a first time increment by a first traction force, the first traction force being a maximum traction force in a transitory kinematic state of the current speed of the vehicle.

3. The method as claimed in claim 2, wherein the first traction force is calculated based on a smaller value between a reference traction force and a traction force resulting from a first map linking the vehicle speed to a traction force, the reference traction force being calculated from a position of an accelerator pedal.

4. The method as claimed in claim 3, wherein the first map is selected from a plurality of maps based on a pair formed by the current kinematic state and the intended kinematic state.

5. The method as claimed in claim 2, wherein the calculating includes multiplying a second time increment by a second traction force, the second traction force being a maximum traction force for the intended kinematic state.

6. The method as claimed in claim 5, wherein the second traction force is calculated based on a smaller value between a reference traction force and a traction force resulting from a second map linking the vehicle speed to a traction force, the reference traction force being calculated from a position of an accelerator pedal.

7. The method as claimed in claim 5, wherein the calculating includes subtracting a resistive force from at least one of the first traction force and the second traction force, the resistive force being calculated based on a history of a traction force at the vehicle wheels and of a history of speed of the vehicle, is subtracted.

8. A drivetrain system for a motor vehicle, or a motor vehicle with hybrid propulsion, the system comprising:
  a set of couplers and reducers configured to link one or more drive wheels of the vehicle to a powertrain of the vehicle, the drivetrain configured to assume a plurality of kinematic states, and each of the kinematic states is defined by a different engagement of the couplers and reducers of a transmission that links a motor of the powertrain to at least one drive wheel; and
  an electronic control unit configured to
    calculate at least a first value and a second value, the first value being calculated based on a first time increment multiplied by a first traction force and the second value being calculated based on a second time increment multiplied by a second traction force, the first traction force being a maximum traction force in a transitory kinematic state of the current speed of the vehicle, and the second traction force being a maximum traction force for the intended kinematic state,
    calculate an end speed of a change of state before the kinematic state is changed by the following:
      calculating a transition time interval for the current kinematic state to be changed to the intended kinematic state,
      calculating a change in speed of the motor vehicle during the transition time interval, the change in speed of the motor vehicle during the transition time interval being equal to a difference in a value of the speed of the vehicle at a start of the transition time and a value of the speed of the vehicle at an end of the transition time,
      calculating a stabilization time interval for the motor vehicle to be stabilized in the intended kinematic state, and
      calculating a change in speed of the motor vehicle during the stabilization time interval, the change in speed of the motor vehicle during the stabilization time interval being equal to a difference in a value of the speed of the vehicle at a start of the stabilization time and a value of the speed of the vehicle at an end of the stabilization time, and
      adding the change in speed of the motor vehicle during the transition time interval and the change in speed of the motor vehicle during the stabilization time interval to the current speed of the vehicle to determine the end speed of the change of state, compare the calculated end speed of the change of state with a threshold, and prohibit the change of state to the intended kinematic state at least temporarily when the calculated end speed is greater than the threshold.

9. A motor vehicle with hybrid propulsion comprising:
the drivetrain system as claimed in claim 8,
wherein the drivetrain system occupies different kinematic states including
a first kinematic state, a torque at wheels being provided at least partly by a first internal combustion engine,
a second kinematic state different from the first kinematic state, the torque at the wheels being provided at least partly by an electric motor, and
the electronic control unit being configured to prohibit at least part of the kinematic states per time interval necessary for the intended kinematic state based on the first and second value.

10. A method controlling a state of a drivetrain of a motor vehicle, or a motor vehicle with hybrid propulsion, wherein the drivetrain includes a set of couplers and reducers between a powertrain of the vehicle and one or more drive wheels of the vehicle, the drivetrain configured to assume a plurality of kinematic states each defined by an engagement ratio of the couplers and reducers allowing linking of a motor of the powertrain to at least one drive wheel, the method comprising:

calculating at least a first value and a second value, the first value being calculated based on a first time increment multiplied by a first traction force and the second value being calculated based on a second time increment multiplied by a second traction force, the first traction force being a maximum traction force in a transitory kinematic state of the current speed of the vehicle, and the second traction force being a maximum traction force for the intended kinematic state;

calculating an end speed of a change of state before a kinematic state is changed based on the first and second value, the calculating the end speed comprising:

calculating a transition time interval for the current kinematic state to be changed to the intended kinematic state, calculating a change in speed of the motor vehicle during the transition time interval, the change in speed of the motor vehicle during the transition time interval being equal to a difference in a value of the speed of the vehicle at a start of the transition time and a value of the speed of the vehicle at an end of the transition time, calculating a stabilization time interval for the motor vehicle to be stabilized in the intended kinematic state, and calculating a change in speed of the motor vehicle during the stabilization time interval, the change in speed of the motor vehicle during the stabilization time interval being equal to a difference in a value of the speed of the vehicle at a start of the stabilization time and a value of the speed of the vehicle at an end of the stabilization time, and adding the change in speed of the motor vehicle during the transition time interval and the change in speed of the motor vehicle during the stabilization time interval to the current speed of the vehicle to determine the end speed of the change of state;

comparing the calculated end speed of the change of state with a threshold; and prohibiting the change of state to the intended kinematic state at least temporarily when the calculated end speed is greater than the threshold.

\* \* \* \* \*